(12) United States Patent
Niermann et al.

(10) Patent No.: US 7,086,942 B2
(45) Date of Patent: Aug. 8, 2006

(54) CHOPPING AND DISTRIBUTING DEVICE

(75) Inventors: Martin Niermann, Harsewinkel (DE); Joerg Brinkmann, Harsewinkel (DE); Norbert Strieker, Verl (DE); Ludger Hugenroth, Ostbevern (DE); Stefan Teroerde, Warendorf (DE); Thorsten Stiller, Lage (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 10/939,613

(22) Filed: Sep. 13, 2004

(65) Prior Publication Data
US 2005/0059445 A1    Mar. 17, 2005

(30) Foreign Application Priority Data
Sep. 15, 2003 (DE) ................................ 103 42 922

(51) Int. Cl.
*A01F 12/30*    (2006.01)
(52) U.S. Cl. .................................... 460/111
(58) Field of Classification Search ................ 460/111, 460/112, 901, 79, 69; 241/101.76, 190; 239/666
See application file for complete search history.

(56) References Cited

U.S. PATENT DOCUMENTS

| 4,921,469 | A  | * | 5/1990 | Scharf .................... 460/10 |
|---|---|---|---|---|
| 5,833,533 | A  | * | 11/1998 | Roberg ................... 460/112 |
| 6,082,647 | A  | * | 7/2000 | Claes ................... 241/186.3 |
| 6,616,528 | B1 | * | 9/2003 | Wolters et al. ............. 460/111 |
| 6,685,558 | B1 | * | 2/2004 | Niermann et al. .......... 460/111 |
| 6,736,721 | B1 | * | 5/2004 | Niermann et al. .......... 460/112 |
| 6,939,221 | B1 | * | 9/2005 | Redekop et al. ............ 460/111 |
| 2002/0072400 | A1 | * | 6/2002 | Foth ...................... 460/112 |
| 2004/0053652 | A1 | * | 3/2004 | Duquesne et al. .......... 460/112 |

FOREIGN PATENT DOCUMENTS

EP    0 212 337    3/1987

* cited by examiner

*Primary Examiner*—Árpád Fábián Kovács
(74) *Attorney, Agent, or Firm*—Michael J. Striker

(57) ABSTRACT

For operating a self propelling harvester provided with a cutterbar and a chopping and distributing device located in a discharge region and supplying a crop stream to at least one ejecting blower, a discharge direction of the crop stream from the ejecting blower is adjusted by a breaking edge which is longitudinally displaceable by a drive, wherein the drive for adjusting the at least one breaking edge is regulated depending on the working width of the cutterbar and/or depending on the distribution of the crop stream on the ground, to adapt the scattering width automatically to the working width of the cutterbar and to distribute in a uniform layer density on the ground.

7 Claims, 3 Drawing Sheets

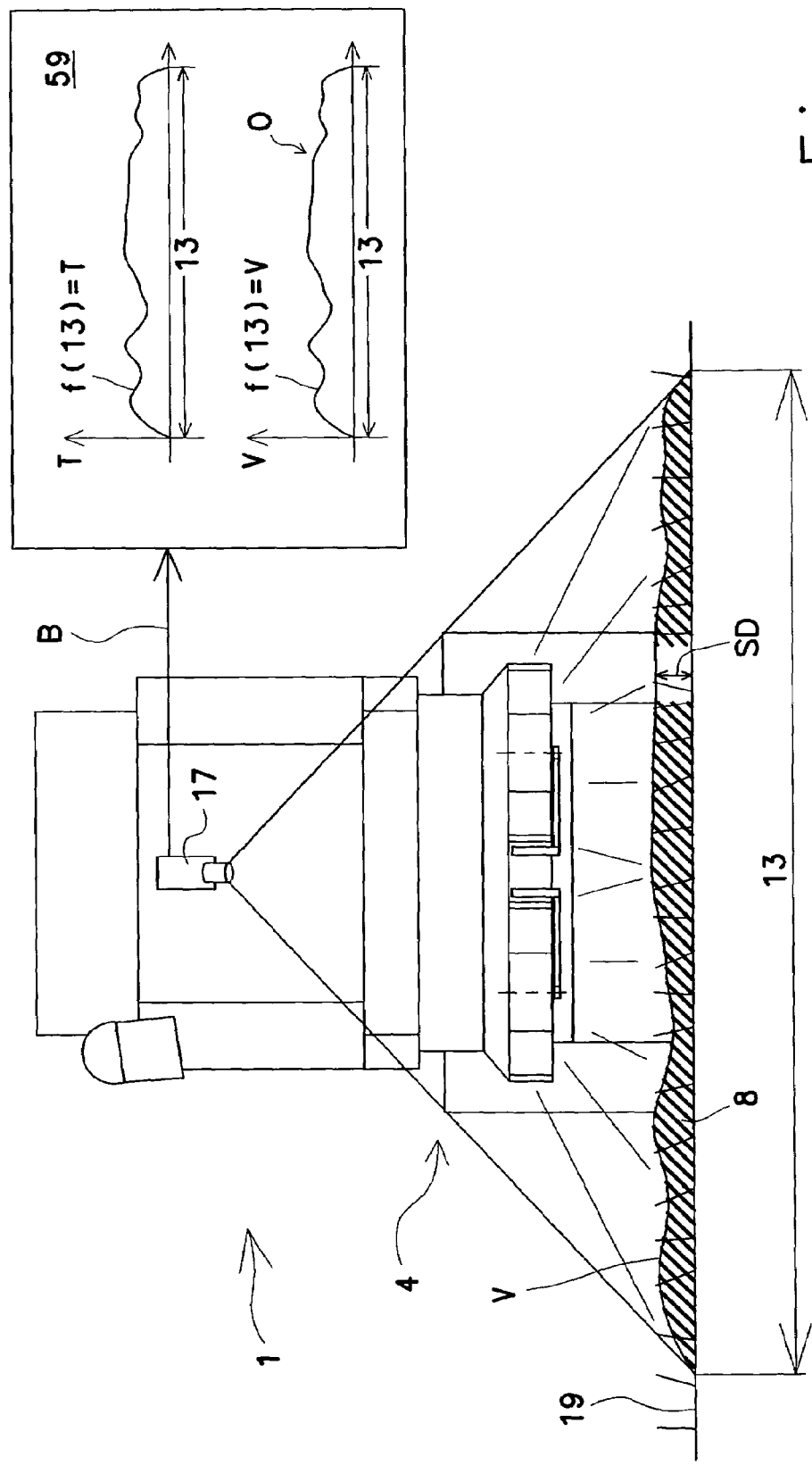

CHOPPING AND DISTRIBUTING DEVICE

BACKGROUND OF THE INVENTION

The present invention relates to a method of and an apparatus for operating a harvester provided with a cutterbar.

European patent document EP 0 212 337 discloses an arrangement for a combine harvester for distribution of straw and chaff. With this device, two oppositely running rotors are provided with a plurality of adjustable, vane-shaped plates in a rear output region of the harvester near one another, which are supported rotatably about parallel axes. Both rotors on the outer side have a mechanically adjustable partial casing, that limits the scattering region of the arrangement. Both rotors are driven jointly through a transmission with the same rotary speed.

This arrangement has the disadvantage that the scattering width behind the harvester is changeable only by a manually adjustable orientation of the rotors and the partial casings or the adjustment of the rotary speed of the rotor plates, while the straw and the chaff are not uniformly distributed on the field.

SUMMARY OF THE INVENTION

Accordingly, it is an object of the present invention to provide a method of operating a harvester thresher, which avoids the disadvantages of the prior art.

More particularly, it is an object of the present invention to provide a method of operating a combine harvester, in which the scattering width is adapted automatically to the working width of the cutterbar and the distributor distributes the crop flow with each scattering width in a uniform layer density on the field.

In keeping with these objects and with others which will become apparent hereinafter, one feature of the present invention resides, briefly stated, in a method of operating a self-propelling harvester provided with a cutterbar and a chopping and distributing device arranged in a discharge region and supplying a crop stream to at least one ejecting blower, the method comprising the steps of adjusting a discharge direction of the crop stream from the ejecting blower by at least one breaking edge which is longitudinally displaceable by a drive; and regulating the drive for adjusting the at least one breaking edge in dependence on a working width of the cutterbar.

Another feature of the present invention resides, briefly stated, in a method of operating a self-propelling harvester provided with a cutterbar and a chopping and distributing device in a discharge region from which a crop stream is supplied to at least one ejecting blower, the method comprising the steps of adjusting a discharge direction of the crop stream from the ejecting blower by at least one breaking edge that is longitudinally displaceable by a drive; and regulating the drive for adjusting the at least one breaking edge in dependence on a distribution of the crop stream on the ground.

Since the drive for adjustment of the at least one breaking edge is regulated in dependence on the working width of the cutterbar, the scattering width can be adapted to the working width automatically in a simple manner.

Advantageously, the adjustment of the breaking edge is performed in accordance with the present invention by an electro-hydraulic adjusting member which is connected with a control unit, so that on one hand the adjustment region and also the adjustment speed of the breaking edge can be regulated.

When adjustment of the adjusting member is detected in accordance with the present invention preferably via a rotary angle sensor which is connected with the control unit, the control obtains continuously information about the position of the breaking edge.

For relieving the driver which is occupied with multiple tasks, the cutterbar in accordance with the present invention can be detected preferably by a sensor connected with the control and provides a cutterbar width signal and sends to the control unit the cutterbar width signal corresponding to the working width of the cutterbar.

A characteristic field stored in accordance with the present invention in the control unit contains preferably a plurality of function curves for different cutterbars. With the cutterbar width signal that corresponds to the cutterbar width of the cutterbar, the associated function curve is selected automatically from the characteristic field.

The optimal operational parameters in accordance with the present invention are determined without participation of the driver, which means a further relief of the driver.

The adjusting member in accordance with the present invention is regulated advantageously via the associated function curve, so that an optimal adjustment of the crop stream so that an optimal distribution of the crop stream through the automatically adjusted scattering width is provided.

In order to take into consideration further outer influences in the function curves, that have the influence of the scattering width, such as for example the wind direction and the intensity, the function curves which are pulled with the function curves and the disruption variables are computed in the control unit.

For providing a uniform distribution of the crop stream on the ground, the drive for adjusting the at least one breaking edge is regulated in accordance with the present invention in dependence on the distribution of the crop stream on the ground.

Preferably, the adjustment of the breaking edge is performed in this method via an electro-hydraulic adjustment member which is connected with a control unit, so that on the one hand the adjusting region and on the other the adjusting speed of the breaking edge can be regulated.

Since the adjustment of the control member is detected preferably via a rotary angle sensor which is connected with a control unit, the control continuously obtains information about the actual position of the breaking edge.

For determination of the distribution of the crops stream, advantageously a layer density profile of the distributed crop stream on a supporting surface is determined, which can be considered as a value for the distribution. For measuring the distribution directly on line, the distribution of the crop on the ground is determined wirelessly by means of a sensor unit.

In accordance with one embodiment of the invention, for determination of the distribution of the chopped product, an infrared image of the discharge surface is produced by an infrared camera and from it a temperature profile is provided, with which the distribution is regulated. The infrared image has the advantage that the surface profile of the ground is taken into consideration.

For adapting by the adjusting member the movement of the breaking edge immediately after the measurements, in accordance with a further embodiment of the present invention the temperature profile is transmitted to the control unit which generates the profile into a surface profile, that is drawn for regulation of the adjusting member.

In an alternative embodiment of the present invention, the sensor unit is a laser sensor which scans the discharge surface and produces a surface profile. The laser sensor is a price-favorable apparatus when compared with the infrared camera, and has a sufficient accuracy.

In accordance with another alternative embodiment of the present invention, for adapting the movement of the breaking edge directly after the measurement of the distribution, the surface profile is transmitted to the control unit that evaluates the profile and regulates the adjusting member independently from the surface profile.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a rear view of the harvester thresher, in accordance with the present invention.

DESCRIPTION OF THE PREFERRED EMBODIMENTS

Figure 1:
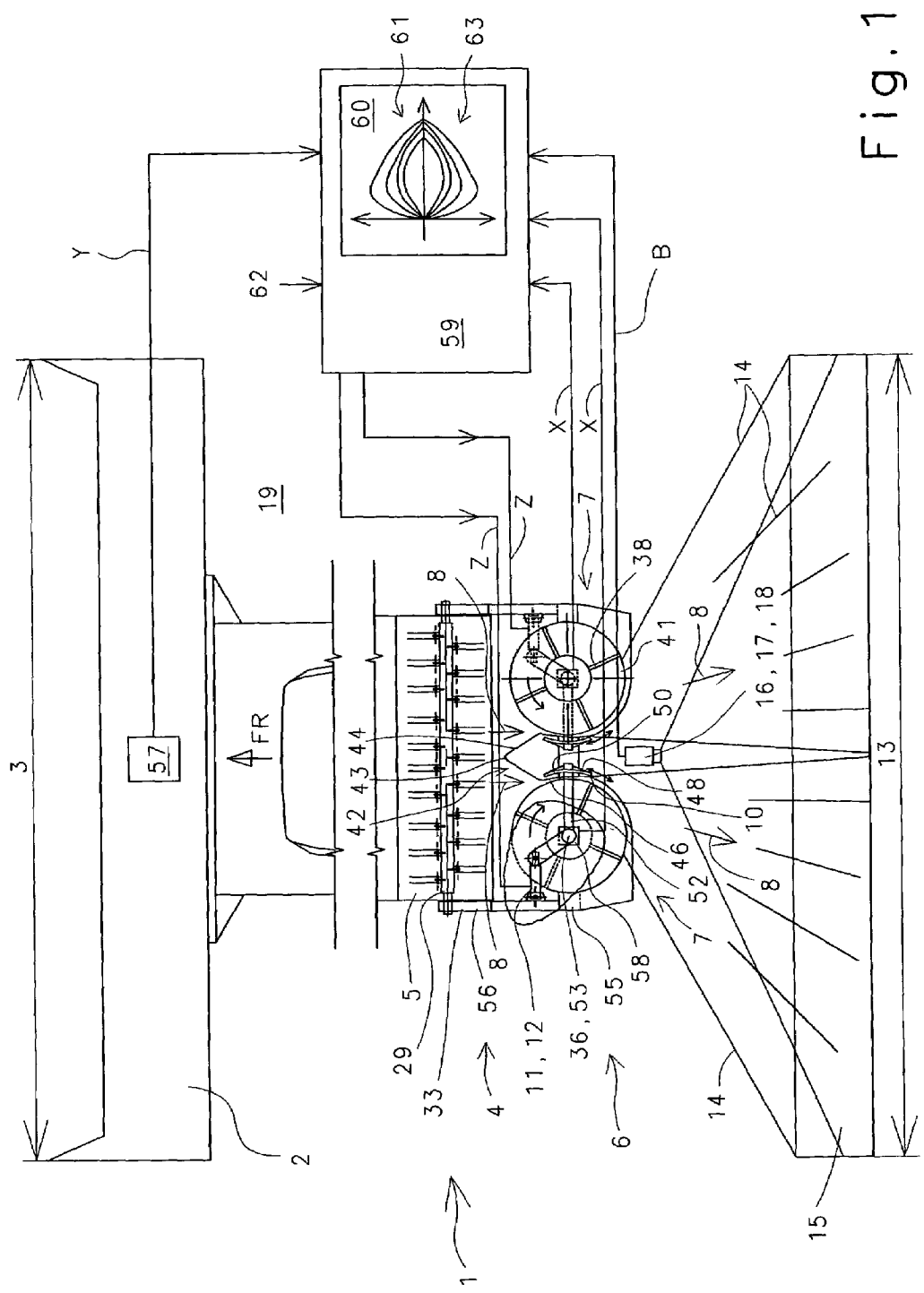
FIG. 1 is a schematic plan view of a combine harvester during a harvesting travel, in accordance with the present invention.

In FIG. 1 a schematic side view of a combine harvester 1 during a harvester travel is shown. The crop is mowed on the field with a cutterbar 2 arranged at a front side on the combine harvester 1 and having a working width 3. Subsequently it is supplied to the known not shown working elements in the combine harvester 1. The working elements in the combine harvester 1 separate the crop into grains, chaff and straw.

A chopping and distributing device 4 is arranged at the rear side of the combine harvester. It is composed of a chopping element 5 and a distributing device 6 connected to it. The distributing device 6 is composed of two ejecting blowers 7 which radially separate the crop stream 8 supplied by the chopping element 5. The ejecting blowers 7 are provided with reciprocating breaking edges 10 that are driven separately each by an adjusting member 12.

The crop steam 8 exiting the ejecting blowers 7 is deviated and distributed by the driving breaking edges 10 during discharge from the distributing device 6. The adjusting region of the breaking edges 10 determines on the one hand a scattering width 13 of the crop steam 8 and the speed of the breaking edge 10 on the other hand determines a distribution V of the crop steam 8 onto the ground 19 as shown in FIG. 3.

Several flow paths 14 which represent the distributed crop quantity 8 are shown behind the ejecting blowers 7. The ends of the outer flow paths 14 limit the scattering width 13 from outside. A discharge surface 15 is located in the traveling direction FR behind the scattering width 13, on which the crop stream 8 is distributed in same layers. An infrared camera 17 installed on the rear side of the combine harvester 1 is oriented toward the discharge surface 15.

Figure 2:
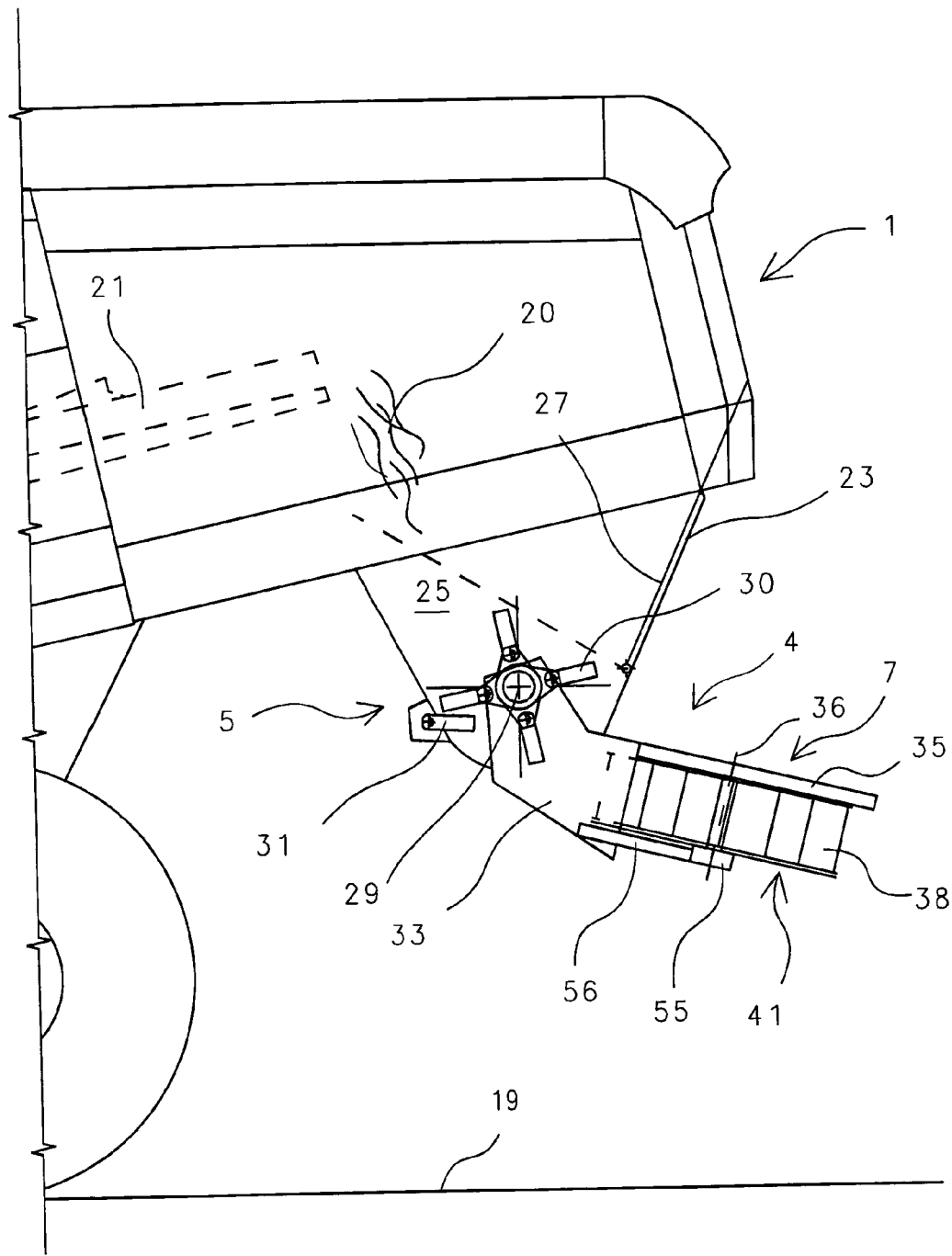
FIG. 2 is a side view of a linear part of the harvester thresher, in accordance with the present invention.

The ejecting blowers 7 are supported on a frame 33, that is supported outside a chopper housing 25 on a chopper shaft 29. A rearwardly protruding cover plate 35 shown in FIG. 2 is connected with the frame 33. Rotary axles 36 are drivingly supported in it. The rotary axles 36 are provided with flexible ejecting blades 38, that at the lower side are limited by a co-rotating disc 41. A V-shaped product separating plate 42 is arranged between the ejecting blowers 7 and composed of the upper cover plate 35, the rotating axles 36, the ejecting blades 38, and the disc 41. The product separating plate 42 has a tip 43 which is oriented opposite to the crop stream 8 coming from the chopping and distributing device 6.

Both legs 44 on the product separating plate 42 enclose a chamber and form rigid partial casings 46 for the ejecting blower 7. On these rigid partial casings 46, movable partial casings 48 are connected and composed of a further wall part 50. The wall part 50 is mounted on an angle lever 52 which is rotatably set on a pin 53. The latter is fixedly connected with a transverse traverse 55, which is mounted on the frame 33 through a conventional longitudinal support 56. An adjusting member 12 is articulately connected on the other end of the angle lever 52 and in turn is articulately connected with the transverse traverse 55 and drives the partial casings 48. Both partial casings 48 form a breaking edge 10 of an outlet opening of the ejection blower 7, running in a rotary direction.

FIG. 2 shows a side view of the rear portion of the combine harvester 1. The straw 20 which is separated from the crop by not shown and known working elements in the combine harvester 1, is supplied via a hurdle shaker 21 to the rear region of the combine harvester. Swath flaps 27 are mounted on the housing rear wall 23 of a chopper housing 25 turnably in two positions. In the swath position SW shown in a broken line, the straw 20 which falls from the hurdle shakers 21 onto the swath flap 27 slides over the chopping and distributing device 24 and is deposited on the field in a swath, not shown. In a chopper position HA of the swath flap 27, the straw 20 falls on the chopping element 5. The chopping element 5 has a rotatable chopper shaft 29 supported in the chopper housing 25. The chopper shaft 29 is provided with movable knives 30 which engage with counter knives 31 fixedly arranged in the chopper housing 25. The straw 20 is comminuted to a chopped product 1 by the knives 30, 31 and supplied radially into the ejecting blowers 7.

Various sensors are provided at various locations of the combine harvester shown in FIG. 1. They include a sensor 57 which detects the working width 3 of the cutterbar 2. They further include rotary angle sensors 58 arranged in the region of the ejecting blowers 7 and detecting the position of the breaking edges 10. They finally include a sensor unit 16 installed at the rear side of the combine harvester 1.

In a first embodiment the working width 3 of the cutterbar 2 is automatically determined by the sensor 57 on the combine harvester 1. The sensor 57 produces a cutterbar width signal Y that depends on the working width 3 of the cutterbar 2, when a cutterbar 2 is mounted. The cutterbar width signal Y is transmitted to a control unit 59 which is connected with a sensor 57.

The position of the breaking edge 10 is measured by the rotary angle sensor 58, that is connected with a control unit 59. The rotary angle sensor 58 produces a signal X, that changes proportionally to a rotary angle A of the angle lever 52 around the rotary axis 36.

A characteristic field 6 with several function curves 61 for different cutterbars 2 is stored in the control unit 59. It regulates the position-dependent speed and the adjustment region of the control member 12. With the cutterbar width signal Y, an associated function curve 61 is selected from the characteristic field 60 and, depending on the signal X, a control command Z is determined from the function curve 61 and transmitted to the control member 12.

For taking into consideration further disturbance variables 62, function curves 63 connected with the determined function curve 61 and the further disturbance variable 62 can be computed by the control unit 59. The disturbance variables 62 include crop parameters, such as the straw quantity, the traveling speed, the wind intensity and/or direction, the inclination.

FIG. 3 shows a rear view of a combine harvester 1, with an infrared camera 17 oriented toward the discharge surface 15. The distributed crop is located on the ground 19 on the discharge surface 15. The ground 19 is shown with the distributed crop stream in a cross-section so that a layer thickness profile SD of the crop stream or the scattering width 13 can be seen. A distribution V of the crop steam can be seen on the layer thickness profile SD.

The infrared camera which is mounted on the rear side of the combine harvester 1 and oriented toward the discharge surface 15, produce an image signal B of the discharge surface 15. The image signals B are supplied to the control unit 59 connected with the infrared camera 17.

The control unit 59 produces, with the image signals B and the signals X, a temperature profile T. The temperature profile T is proportional to the layer density profile SD, on which the distribution V of the straw/chaff mixture on the discharge surface 15 can be seen.

The comparison of the temperature profile T with the layer thickness profile SD is based on the concept that different crop quantities on the field lead to different surface temperatures on the field.

The control unit 59 evaluates the temperature profile T, from which a surface profile O is generated. The control unit 59 transmits a control command Z to the control member 12, that regulates the control member 12 depending on the surface profile O, so that the distribution V is changed with the objective that the temperature on the discharge surface 15 be equal at all locations.

Both methods can be combined with one another, wherein the cutterbar 2 regulates for example the turning region of the breaking edge 10 and thereby the scattering width 13, while the distribution V is used for regulation of the speed of the moving breaking edge 10.

The surface of the discharge surface 15 in accordance with a further embodiment can be scanned with a laser sensor 18, for detecting the distribution. From the determined measuring data, a surface profile O is produced.

The control unit 59 evaluates the surface profile O and transmits the control command Z to the control member 12, that controls the control member 12 in dependence on the surfaces so that the distribution V is changed with the objective that the surface of the discharge surface 15 is plane as much as possible.

The comparison of the surface profile O with the layer thickness profile SD is possible under the assumption that the ground 19 on which the crop stream is placed is approximately plane and both are proportional depending on one another.

The surface profile O is transmitted to the control unit 59, which evaluates the profile and regulates the control member 12 in dependence on the surface profile O.

It is believed that the present invention is not limited to the combine harvester and can be used on other agricultural machines with the same results.

It will be understood that each of the elements described above, or two or more together, may also find a useful application in other types of methods differing from the types described above.

While the invention has been illustrated and described as embodied in a method of operating a harvester, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A method of operating a self-propelling harvester provided with a cutterbar and a chopping and distributing device arranged in a discharge region and supplying a crops stream to at least one ejecting blower, the method comprising the steps of adjusting a discharge direction of the crop stream from the ejecting blower by at least one breaking edge which is longitudinally displaceable by a drive; and regulating the drive for adjusting the at least one breaking edge in dependence on a working width of the cutterbar.

2. A method as defined in claim 1; and further comprising using an electro-hydraulic control member connected with a control unit for the adjusting the breaking edge.

3. A method as defined in claim 2; and further comprising detecting the adjusting of the control member by a rotary angle sensor connected with the control unit.

4. A method as defined in claim 1; and further comprising detecting the cutterbar with a sensor connected with a control unit and transmitting by the sensor to the control unit a cutterbar width signal corresponding to the working width.

5. A method as defined in claim 4; and further comprising storing in a characteristic field of a control unit a plurality of function curves for different cutterbars; and selecting from the characteristic field a function curve with the cutterbar width signal corresponding to the working width of the cutterbar.

6. A method as defined in claim 1; and further comprising using a control member for the adjusting the breaking edge; and regulating the control member via an associated function curve.

7. A method as defined in claim 5; and further comprising computing in the control unit the associated function curve and at least one further function curve connection with a further distortion variable.

* * * * *